July 19, 1960

R. H. COLLINS 2,945,716

TWINE KNOTTER MECHANISM

Filed Feb. 14, 1958

*INVENTOR.*
ROBERT H. COLLINS
BY Eugene M. Eckelman
ATTORNEY

United States Patent Office
2,945,716
Patented July 19, 1960

2,945,716
TWINE KNOTTER MECHANISM
Robert H. Collins, Rte. 1, Brownsville, Oreg.
Filed Feb. 14, 1958, Ser. No. 715,325
6 Claims. (Cl. 289—14)

This invention relates to improvements in twine knotter mechanisms of the type utilized on grain baling machines and the like.

In the use of twine for the tying of bales of grain or the like, difficulty has been experienced in providing knotter mechanisms which will tightly tie twine around the bale without damage to either the twine or parts of the knotter mechanism. If the twine is damaged in the formation of the bale, the twine will break and the bale may fall apart, causing costly delays in either the baling or transportation operation. Likewise, in each baling cycle, if there is a strain on the gears or other parts, then there must be frequent parts replacements and shutdowns.

A principal object of the invention is to provide a twine knotter having improved means for tying a tight bale without damage to critical portions of the twine or to portions of the knotter or drive means therefor.

Another object is to provide a twine knotter having improved means facilitating axial slippage of the twine in a twine knotting operation and a positive set position of the twine during the formation of a bale.

More specific objects are to provide an improved twine holder in the knotter mechanism which operates in conjunction with a rotatable disc assembly for permitting twine to slip therethrough at selected times and to positively grip the twine at other selected times, and to provide improved stop or abutment means acting on the twine holder for causing a novel cooperation of said holder with the disc assembly.

The objects set forth above are accomplished by a knotter mechanism employing an improved twine holder utilized in connection with a rotatable disc assembly for holding the twine at a predetermined tension while a knot is being tied and at a predetermined tension when a bale is being formed. Such selected tension grips on the twine are accomplished by means acting on the twine holder comprising a spring which urges it toward the disc assembly and a stop or abutment which limits such movement toward the disc assembly. Although the stop may assume various forms, it is illustrated herein as a resilient stop comprising a leaf spring. The invention will be better understood with reference to the description in the following specification of a preferred form thereof. Various changes may be made, however, in the construction and arrangement of parts, without departing from the spirit of the invention.

Figure 1:
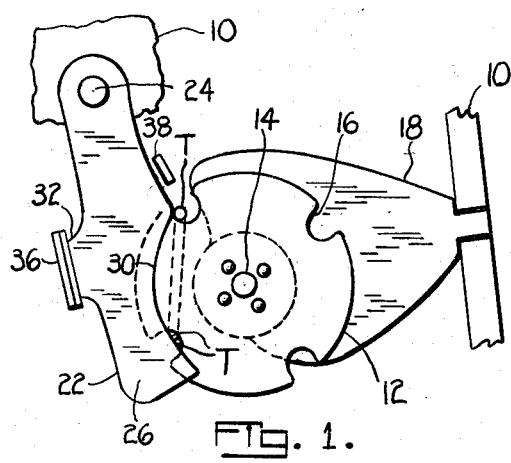
Figure 1 is an elevational view, with parts of the frame broken away, showing the cooperation between the twine holder and rotatable disc assembly, such view illustrating the opposition of the twine between the twine holder and disc assembly at the time a bale is being formed.

The present invention is incorporated in a knotter mechanism having a cast frame member 10, only a fragmentary portion of such frame being shown in the drawings as such frame is of well-known construction. A disc assembly comprises a pair of discs 12 mounted integrally on a shaft 14, and these discs have peripheral notches 16 adapted to receive strands of twine T. Suitable drive means are adapted to rotate the shaft 14 at selected times during a baling operation and thereby drive the discs 12 through a predetermined rotation for advancing the twine T therewith into different positions, as well understood in the art. A stationary twine cleaner 18 extxends between the pair of discs 12 and is shaped so as to direct the twine into the notches 16 in the discs 12 and also to remove the twine therefrom, upon the rotation of the discs 12 a predetermined amount.

Figure 3:
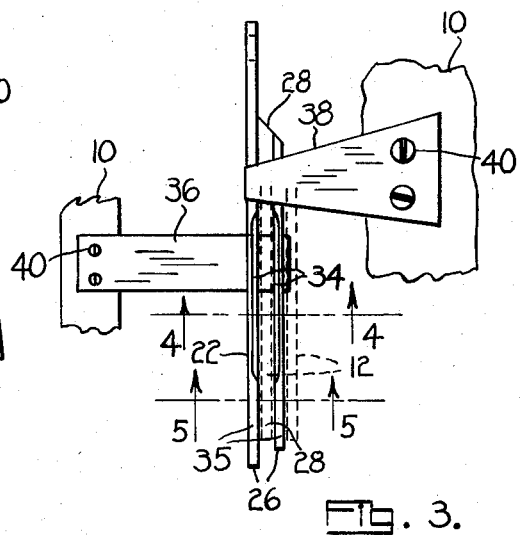
Figure 3 is an edge view of the twine holder showing the pair of springs operable thereon, the discs 12 being shown in dotted lines.

A twine holder 22 is pivotally mounted by a pin 24 on the frame member 10 and comprises a pair of arms 26 secured together in spaced relation adjacent their ends by spacer blocks 28. The twine holder is mounted adjacent the discs 12 and is disposed so that one of the discs 12 is between the two arms 26, Figure 3, whereby twine T is adapted to be compressed and gripped between the twine holder and discs.

The two arms of the twine holder assume approximately the same configuration except that one of the arms thereof at the end opposite the pivot point is slightly shorter than the other. The edges of the twine holder facing the disc assembly are arcuately contoured at 30 and have a radius approximating that of the discs 12. The opposite or back edges of the twine holder arms have projections 32 forming a spring abutment.

Each of the arms 26 along a portion of the arcuate curvature 30 has inwardly inclined beveled portions 34 which serve to increase the free space between the overlapped portions of the twine holder and the disc assembly and thereby to lessen the grip on the twine positioned between the twine holder 22 and the discs 12, whereby the twine is capable of sliding axially during the time the discs are moving it along the beveled portions. The beveled portions 34 terminate short of the free end of the arms a predetermined distance and unbeveled portions 35 thereby exist adjacent the free ends of the arms. These unbeveled edge portons of the twine holder arms are adapted to cooperate with the discs 12 for holding the twine in a set, non-sliding position, this set position being one in which a bale is being formed and wherein the twine must be held stationary against axial movement.

A spring 36 bears on the projections 32 and urges the twine holder toward the discs whereupon a grip can be obtained on the twine between the twine holder and disc assembly. Mounted on the opposite side of the twine holder from the spring 36 is a stop or abutment 38 and as illustrated this stop comprises a leaf spring which provides a resilient abutment for the twine holder. The twne holder engages the resilient abutment 38 upon pivoting a predetermined distance into the discs for purposes to be explained. These two springs are suitably mounted on the stationary frame member 10 by screws 40.

Referring now to the operation of the device, twine is laid in the upper left notch 16 in the discs 12, Figure 1, by a needle assembly, not shown. The twine which is laid by the needle mechanism into the notch extends around the bale to a knotter bill hook, also not shown, and when the twine is thus positioned the discs 12 are caused to rotate and thereby carry the twine into engagement with the twine holder. At this time the bill hook operation is initiated and as it requires twine to form the knot it is desirable that the twine be permitted to move axially. Therefore, in accordance with the present invention, during the operation of the bill hook the twine is in the plane of the beveled portions 34 of the twine holder arms and as these beveled portions increase the amount of free area between the twine holder and the discs, the grip on the twine is reduced and said twine can readily slide, thus facilitating efficient operation of the bill hook without injury to the twine or operating parts of the knotter.

As the knot is being completed the discs move the twine beyond the end of the beveled edges 34 and into engagement with the unbeveled edges 35. In this position a firm and non-sliding grip is obtained on the twine and the twine is held against axial movement for the formation of a bale.

Figure 2:
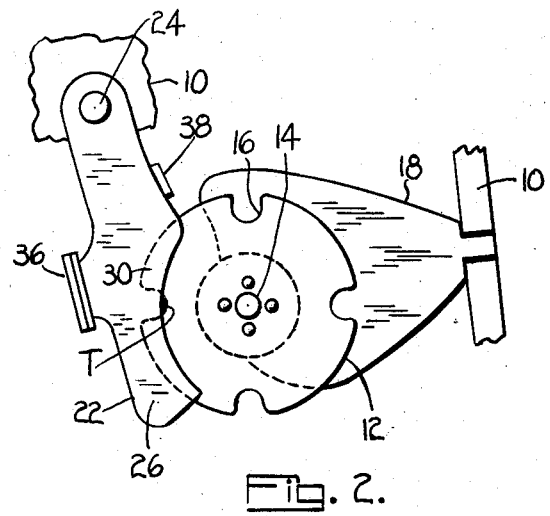
Figure 2 is a view similar to Figure 1 but showing the position of the twine when a knot therein is being formed.
Figure 4:
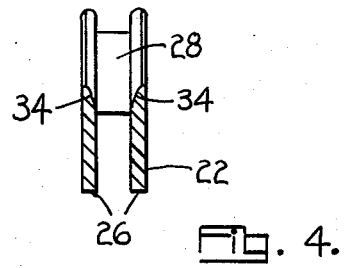
Figure 4 is a sectional view of the twine holder taken on the line 4—4 of Figure 3.
Figure 5:
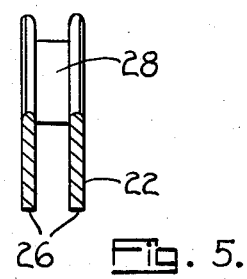
Figure 5 is a sectional view of the twine holder taken on the line 5—5 of Figure 3.

The spring 36 functions to urge the twine holder 22 toward the disc assembly and when twine is moved between the discs 12 and the twine holder, as was described above, said twine holder and discs are urged apart somewhat. More specifically, as the twine is moved along the edge of the twine holder by the discs 12, the twine holder pivots more into the discs when the twine is engaged with the beveled portion 34 of the arms 26 than when the twine is in engagement with the unbeveled portion. In its former position wherein the twine is in engagement with the beveled portions, the twine holder abuts against spring 38, Figure 2, and this spring opposes spring 36 to restrict its biasing action. When the springs are thusly opposing each other, the twine is not tightly gripped between the twine holder and the discs and can therefore slide in an axial direction to produce the necessary slack for the formation of a knot by the bill hook. When the parts are in the position of Figure 1 wherein the twine is rotated into engagement with unbeveled portions 35 and the twine holder is pivoted away from the disc assembly the spring 38 is not in engagement with the twine holder and the spring 36 exerts its full biasing force without opposition against the twine to hold the twine in a firm grip. Upon movement of the twine off the gripping edges 35 the twine holder can pivot slightly toward the discs and it again comes into engagement with the spring 38. Spring 38 thereby has for one purpose to prevent the spring 36 from too tightly holding the twine holder against the discs when the twine is on the beveled edges 34, thereby insuring free sliding movement of the twine in a knot forming operation, and for another purpose to prevent the twine holder from pivoting too far into the disc assembly whereby the twine holder will not obstruct the notch into which the twine is laid by the knotter needle. Also, it is evident that spring 38 in its opposing action on the twine holder prevents the twine from being gripped between the arms 26 at points below the beveled portions 34 thereby preventing the twine from being pinched between the two parts to assure the desired sliding movement of the twine.

The functions thus performed by this structure facilitate efficient operation of the knotter mechanism without undue wear on the baler parts. Also, maximum density bales can be formed to increase the tons per area storage in a given space and to eliminate costly delays in baling or transportation.

Having now described my invention and in what manner the same may be used, what I claim as new and desire to protect by Letters Patent is:

1. In a twine knotter mechanism having a rotatable disc assembly, a pivoted twine holder having a longitudinal edge adjacent the disc assembly for compressing twine against the disc assembly, said edge being beveled through a portion of its length for forming a slack pulling path for the twine, spring means urging said twine holder toward said disc assembly, and spring abutment means for limiting the pivoting movement of said holder.

2. In a twine knotter mechanism having a rotatable disc assembly, a twine holder, a pair of finger members on said twine holder each having a longitudinal edge adjacent the disc assembly for compressing twine against the disc assembly, a portion of said longitudinal edge on each finger being beveled for forming a slack pulling area for the twine and a portion of said edge being unbevel to form a gripping area for the twine, spring means urging said twine holder toward said disc assembly, and resilient abutment means opposing said spring means through a portion of the pivoting movement of said holder for controlling the extent to which the twine is compressed against said disc assembly.

3. In a twine holder mechanism having a rotatable disc assembly, a pivoted twine holder, a pair of finger members on said twine holder each having a back edge and a front edge, said front edge of said finger members facing the disc assembly and being disposed on opposite sides thereof for compressing twine against the disc assembly, spring means engageable with the back edge of said holder for pivoting said twine holder toward said disc assembly, and abutment means engageable with the front edge of said twine holder for limiting the pivoting movement of said twine holder into said disc assembly for controlling the extent to which the twine is urged against said disc assembly.

4. In a twine knotter mechanism having a rotatable disc assembly, a twine holder having a longitudinal twine engaging edge adjacent the disc assembly for compressing twine against the disc assembly, said edge having twine receiving and discharge ends and being beveled through a portion of its length beginning at the twine receiving end for forming a slack pulling path for the twine through a predetermined increment of rotation of said disc assembly.

5. In a twine knotter mechanism having a rotatable disc assembly, a twine holder having a longitudinal twine engaging edge adjacent the disc assembly for compressing twine against the disc assembly, said edge having twine receiving and discharge ends and being beveled through more than one-half its length beginning at the twine receiving end for forming a slack pulling area for the twine through a predetermined increment of rotation of said disc assembly, a portion of said edge being unbeveled adjacent the discharge end to form a gripping area with said disc assembly for the twine.

6. In a twine knotter mechanism having a rotatable disc assembly, a twine holder having a pair of finger members, said finger members each having a longitudinal twine engaging edge adjacent the disc assembly for compressing twine against the disc assembly, said edges each having twine receiving and discharge ends and being beveled through a portion of their length beginning at the twine receiving end for forming a slack pulling path for the twine through a predetermined increment of rotation of said disc assembly, and spring means urging said twine holder toward said disc assembly.

References Cited in the file of this patent

UNITED STATES PATENTS

| | | |
|---|---|---|
| 2,628,856 | England | Feb. 17, 1953 |
| 2,815,233 | Collins | Dec. 3, 1957 |